United States Patent [19]
Fisher et al.

[11] 3,930,775
[45] Jan. 6, 1976

[54] TESTING AND CORRECTING METERING ACCURACY OF MULTIHOLE SPINNERETS

[75] Inventors: William Bernard Fisher, Chester; Howard Lyle Helmer, Colonial Heights; David Pendlebury, Chester, all of Va.

[73] Assignee: Allied Chemical Corporation, New York, N.Y.

[22] Filed: Sept. 19, 1974

[21] Appl. No.: 507,509

[52] U.S. Cl............................. 425/169; 73/432 R
[51] Int. Cl.² ................... G01B 13/00; D01D 3/00
[58] Field of Search............... 425/169; 73/3, 432 R

[56] References Cited
UNITED STATES PATENTS

| | | | |
|---|---|---|---|
| 1,676,831 | 7/1928 | Levy | 73/3 |
| 3,221,546 | 12/1965 | Heath | 73/3 X |

*Primary Examiner*—Robert D. Baldwin
*Attorney, Agent, or Firm*—Fred L. Kelly

[57] ABSTRACT

A method and apparatus for off-line testing and correcting the metering accuracy of a split multihole spinneret fed by a single metered stream by determining end to end variations in flow rate and by reworking a number of holes in the lower flow rate side of the split spinneret, calculated by multiplying the average test percent bias of the split spinneret by a predetermined constant, so as to bring end to end variations in flow rate to within a required accuracy.

2 Claims, 2 Drawing Figures

3,930,775

TESTING AND CORRECTING METERING ACCURACY OF MULTIHOLE SPINNERETS

BACKGROUND OF THE INVENTION

This invention relates to split multihole spinnerets for the production of multiple yarn ends and, more particularly, to a method and apparatus for diagnosing and correcting non-uniformities in construction of split multihole spinnerets to thereby control denier split in multiple end spinning while employing only one metered feed stream.

Throughout the present specification and claims, the term "yarn" is employed in a general sense to indicate a continuous, often plied, strand comprised of fibers, filaments, glass, metal or plastic. An "end" is a single such strand of yarn. A "split multihole spinneret" is a spin pot spinneret which is divided into two or more parts by means of an unpierced stripe or stripes wide enough to form a visible split between the multiple yarn ends below the spinneret. By "unpierced stripe" is meant that no spinneret holes are drilled in a narrow area across the face of the spinneret. As used herein, the term "fluid" indicates any substance exhibiting laminar flow characteristic. In this discussion, a "Newtonian fluid" is one that under given conditions has a viscosity which is constant and independent of the rate of shear; conversely, a "non-Newtonian fluid" is one that exhibits an apparent viscosity which varies with the rate of shear.

The conversion from single end spinning to multiple end spinning can be extremely expensive if special equipment is required to meter and segregate each yarn end. Aside from initial equipment costs there is the added factor of restricted equipment space. A simple method of reducing these limitations is to feed one metered stream and determine the flow split by the hydraulics of the fluid and the geometry of the split multihole spinneret. This method of multiple end spinning has a further advantage in that a single spin pot and metering system design can be used for spinning both single and multiple ends, thereby increasing the operational flexibility of the equipment. Uniform fluid properties and dynamic similarity between ends in the split multihole spinneret are prerequisites for adequate denier control. Ideally, end to end variations in denier or flow rate are small enough to be inconsequential; in practice, however, there are often relatively wide denier differences between ends when using spinnerets produced to normal tolerances by conventional manufacturing processes.

Some of the factors contributing to denier variability in both single and multiple end spinning are: incorrect spin pump settings, temperature profile across the spinneret face, filament to filament variability due to the range of tolerable hole dimensions within the spinneret, random unfiltered sludge particles variable across and within a given yarn end, air differential in the quench chamber, combinations of these factors, etc. An additional factor, peculiar to multiple end spinning, is filament crossover from end to end as the filaments are extruded from the split multihole spinneret. Denier variability can be reduced by the periodic cleansing of process equipment and by the installation of adequate monitoring equipment; research is continuing to further decrease denier differences.

One of the more important facets dealt with in the prior art is the metering accuracy of spinnerets. Various methods have been proposed for determining the metering accuracy of holes, such as that disclosed by Levy in U.S. Pat. No. 1,676,831 wherein fluid flow rate is measured by first passing a fluid at a given pressure through a hole, and then collecting and weighing the fluid at fixed time intervals. It has also been recognized by Hitchner in U.S. Pat. No. 2,925,692 that the measurement of back pressure exerted due to the resistance to flow of air through a capillary is a means of obtaining metering accuracy. Air is not suitable for measuring the metering accuracy of some spinneret holes because in the range of pressures that are useful for measuring flow resistance accurately, the air flow is turbulent rather than having the laminar flow characteristics of the fluid to be spun. The resultant measurements vary widely and, as a consequence, are not accurate enough for a determination of acceptable denier variation, particularly in fiber forming polymers such as nylon and polyester. Additionally, Booy et al. teach in U.S. Pat. No. 3,433,055 another method of obtaining metering accuracy whereby the holes of a spinneret plate are sequentially positioned under a valve supplied with pressurized liquid and then injected with the liquid. The back pressure due to the flow resistance of each hole is measured and compared to the back pressure generated by a previously tested standard hole to determine deviation in flow resistance of the hole, and finally, the liquid flow is interrupted at the valve to maintain the system under pressure for purging the next capillary too be tested.

Adequate end to end denier control could be achieved by testing all of the individual holes by a prior art method. However, the teachings of the prior art are both costly and time-consuming as spinnerets may have hundreds of holes to be inspected, and in multiple end spinning where the same number of filaments per yarn end may be desirable, this figure can be multiplied by a constant factor. A solution to this problem would be to eliminate the necessity of inspecting all of the holes in a spinneret plate. We have now discovered a novel method of doing this in the extrusion of multiple ends from a split multihole spinneret plate fed by a single metered stream.

SUMMARY OF THE INVENTION

The present invention provides a method for off-line testing and correcting the metering accuracy of a split multihole spinneret fed by a single metered stream. The method comprises the steps of: (a) feeding through the split spinneret a fluid having a viscosity such that its flow through the holes of the split spinneret is laminar, by a single metered stream which hydraulically splits to each of the sides of the split spinneret; (b) collecting in segregation according to the sides of the split spinneret the fluid as it flows therefrom; (c) weighing separately the segregated collections of fluid; ((d) determining the percent bias of the split spinneret, preferably by dividing the absolute difference in weights of test fluid collected from each side of the split multihole spinneret by the lower weight and multiplying by 100; (e) choosing the side of the split spinneret with the lower flow rate for reworking of its respective holes; (f) calculating the number of holes to be reworked in said side of the split spinneret by the equation $$N = k \times D$$

where $N$ is the number of holes to be reworked, $k$ is a constant between 15 and 150, preferably between 40 and 60, and $D$ is the percent bias of the split spinneret; and (g) reworking approximately the number of holes N in the side of the split spinneret having said lower flow rate.

Preferably, the testing and correcting method is repeated until the test percent bias in step (d) does not exceed 0.35 percent.

The reworking of the holes of the split spinneret is accomplished by conventional methods used in manufacture of spinnerets, e.g., biased flow is corrected by reducing the length of holes on the lower flow rate side of the split multihole spinneret. To simplify the reworking procedure, a standard hole length reduction is made. The size of this standard reduction is generally the largest possible within the tolerance allowed for the spinneret manufacture. Holes to be shortened are selected in a scattered or random pattern. When the spinneret is used for the extrusion of heat sensitive materials and when the operational spin pot temperature is higher than the bulk fluid temperature, it is preferred that peripheral holes be avoided in the rework process.

The apparatus for carrying out the above-described method is conventional except for the portion of the apparatus which divides the fluid flowing from the exit end of an inverted split spinneret to be tested and channels it to a collection point. The split spinneret is divided into two or more parts by means of an unpierced stripe or stripes wide enough to form a visible split in the fluid flow at its exit end. The essential elements of the flow divider apparatus include an enclosed wall and sealing means. The enclosed wall has a base which is adapted to form a seal with the periphery of the exit end of the split spinneret without blocking any of the holes therethrough. The enclosed wall also has at least one divider plate, the ends of which terminate at the interior of the enclosed wall. The number and disposition of divider plates corresponds to the number and disposition of the unpierced stripes in the split spinneret. The sealing means is affixed to the bottom of said divider plate of the enclosed wall so as to form a seal with the unpierced stripe of the split spinneret; the enclosed wall with its divider plate thereby defines a plurality of open chambers, the bases of which are formed by the exit end of the split spinneret. The portion of the enclosed wall defining each of the open chambers has an aperture therein with a tube leading outwardly therefrom. Fluid flowing through the split spinneret is thus divided as it exits therefrom and is channeled through the tubes to a collection point.

DESCRIPTION OF THE PREFERRED EMBODIMENT

The preferred embodiment of this invention provides a method for off-line testing and correcting the metering accuracy of a split multihole spinneret fed by a single metered stream for the extrusion of two yarn ends. The method comprises the steps of: (a) feeding a fluid, having a viscosity between 1.0 and 100 centipoises at the testing temperature such that its flow through the holes of the split spinneret is laminar, by a single metered stream which hydraulically splits to each of the two sides of the split spinneret at a predetermined flow rate for a predetermined length of time; (b) collecting in segregation according to the sides of the split spinneret the fluid as it flows therefrom; (c) recording the weights of the segregated collections of fluid and their absolute difference; (d) repeating steps a through c; (e) rotating the split spinneret approximately 180°; (f) repeating steps a through d with the split spinneret in its rotated position; (g) determining the percent bias of the split spinneret for each reading; (h) averaging the percent biases obtained for each reading to determine the test percent bias; (i) repeating steps a through h at least once so that at least two determinations of the test percent bias of the split spinneret will be made; (j) choosing, if the test percent bias for any test exceeds 0.35 percent, the side of the split spinneret with a lower flow rate for reworking of its holes; (k) calculating the number of holes to be reworked in the side of the split spinneret with the lower flow rate by the equation $$N = k \times D$$

where $N$ is the number of holes to be reworked, $k$ is a constant between 40 and 60, and $d$ is the test percent bias of the split spinneret plate; and (1) reworking approximately the number of holes N in the side of the split spinneret with the lower flow rate, avoiding the peripheral holes when the split spinneret is used for the extrusion of heat sensitive materials and when the operational spin pot temperature is higher than the bulk fluid temperature.

Figure 1:
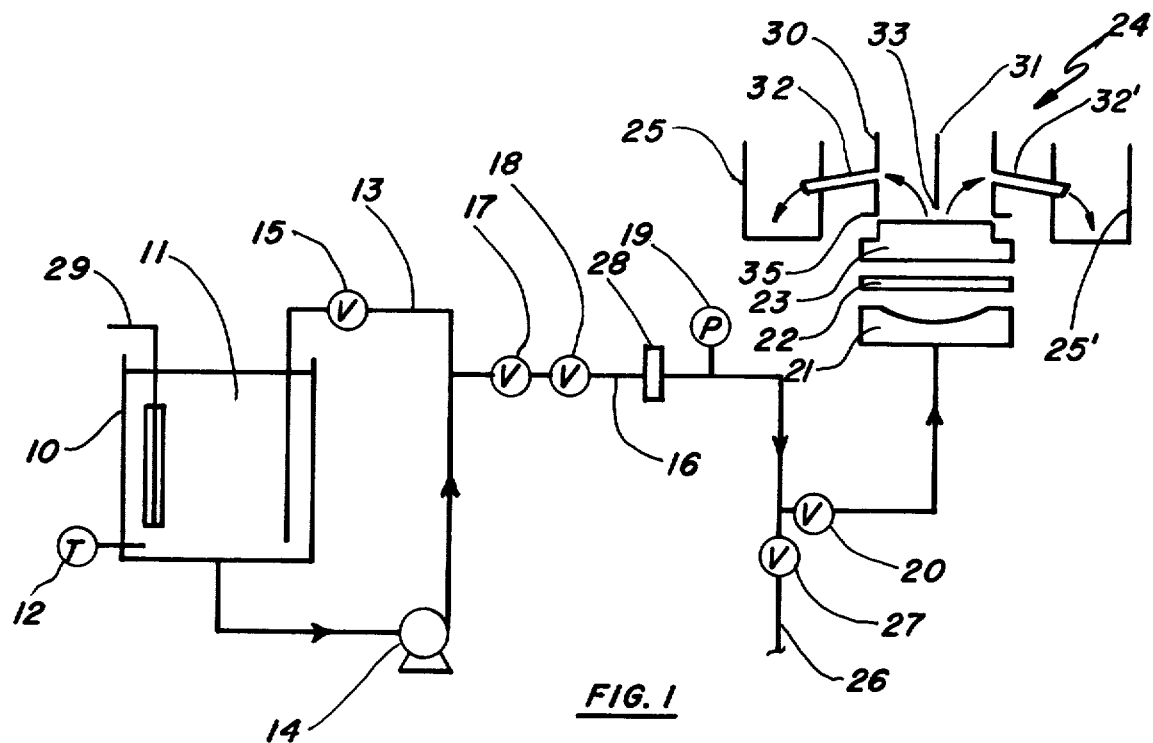
FIG. 1 is a schematic front view of the preferred apparatus used in the method of this invention.

Referring to FIG. 1, a pipe line forms a circulation loop 13 from a tank 10 containing a test fluid 11. The test fluid 11 is removed from the tank 10 and passed through a centrifugal pump 14 and then a first flow control valve 15 before returning to the tank 10 via a dip pipe. The temperature of the test fluid 11 can be read on a thermometer 12 which is inserted into the test fluid 11 through the side of the tank 10. A branch line 16 is taken off the circulation loop 13 between the centrifugal pump 14 and the first flow control valve 15. Test fluid 11 flowing through the branch line 16 will pass through a second flow control valve 17, an on/off valve 18, a first shutoff valve 20, an expansion chamber 21, a filter 22, a split multihole spinneret 23, a flow divider 24, and into flow collectors 25 and 25', in that order. A pressure indicator 19 is teed off the branch line 16 between the on/off valve 18 and the first shutoff valve 20. A drain line 26 with a second shutoff valve 27 is provided between the point at which the pressure indicator 19 is teed off the branch line 16 and the first shutoff valve 20. The drain line 26, which leads to a sewer (not shown), is used only for the periodic cleansing of the test system. An optional second filter 28 can be placed in the branch line 16 between the on/off valve 18 and the point at which the pressure indicator 19 is teed off the branch line 16.

Figure 2:
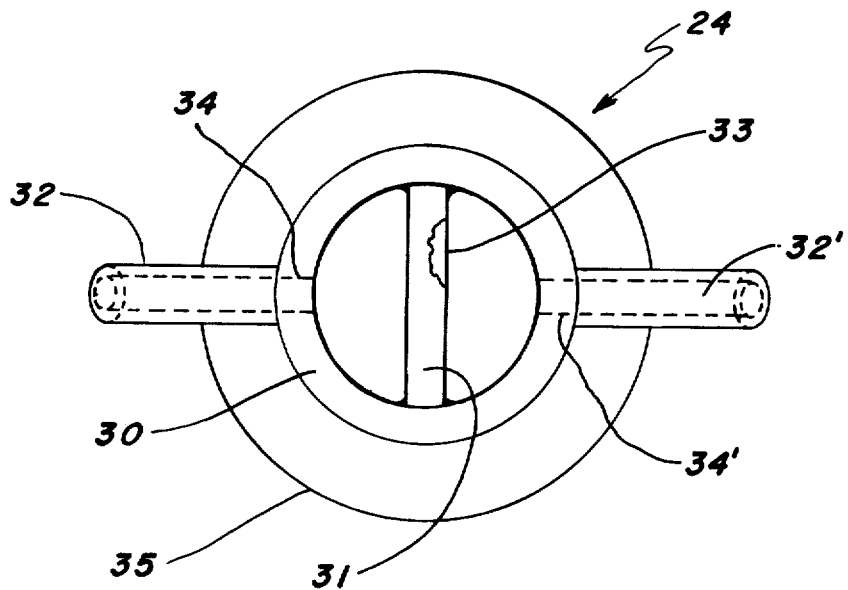
FIG. 2 is a plan view of the flow divider labeled 24 in FIG. 1.

With reference to FIGS. 1 and 2, the flow divider 24 comprises an enclosed wall 30, at least one divider plate 31, and at least two tubes 32 and 32'. The enclosed wall 30 is substantially circular and has a base 35. The enclosed wall 30, along with its base 35, is adapted to form a seal with the periphery of the exit end of a split multihole spinneret 23 without blocking any of the holes therethrough. Divider plate 31 has its ends secured in the enclosed wall 30. The number and disposition of the divider plates corresponds to the number and disposition of the unpierced stripes in the split multihole spinneret. To the bottom of divider plate 31 is affixed sealing means 33; when the enclosed wall 30 is sealed against the periphery of the split multihole spinneret 23, the sealing means 33 forms a seal along the unpierced stripe and divider plate 31 defines with the enclosed wall 30 a plurality of open chambers. The portion of the enclosed wall 30 defining each open chamber has an aperture 34 therein from which a tube 32 leads. The distance of the apertures 34 and 34' from the base 35 of the enclosed wall 30 should be such that any test fluid 11 entering the open chambers of the flow divider 24 from the split multihole spinneret 23 will exit via the tubes 32 and 32' to a collection point.

Pressures during testing will generally be less than 100 p.s.i.g. and temperatures between 15°C. and 70°C. are preferred. Selection of the flow rate and test fluid should be such that the flow will be substantially laminar in the range of pressures utilized. Fluids having a viscosity preferably from 1.0 to 100 centipoises at testing temperature are particularly suitable for use in the test system; it is preferred that the fluid be one that is fairly insensitive to temperature changes and is Newtonian under test conditions. The temperature of the test fluid should be such that its viscosity is maintained in the desired laminar range. Heat produced from the operation of the centrifugal pump 14 may be adequate to give the required temperature. Should additional heat be required, provisions for heating by either electricity or steam can be made with suitable on/off controls to maintain desired temperature; this is shown diagramatically in FIG. 1 by a representative electrical heating element 29.

In operation, the centrifugal pump 14 is cut on with the second flow control valve 17 closed and the first flow control valve 15 partially open. If the centrifugal pump 14 cannot adequately heat the test fluid 11 to the required temperature, then the heating element 29 can be cut on also. Assuming that the centrifugal pump 14 is adequate, simply permit it to heat the test fluid 11 to the required temperature. The expansion chamber 21, the filter 22, the clean split multihole spinneret 23 to be tested, and the flow divider 24 are sandwiched together. The split multihole spinneret 23, the flow divider 24, and the expansion chamber 21 should be perfectly level in the horizontal plane. The disposition of the valves is as follows: first flow control valve 15, open; second flow control valve 17, open; on/off valve 18, closed; first shutoff valve 20, open; and second shutoff valve 27, closed. The tubes 32 of the flow divider 24 should lead at this point to disposal containers (not shown) rather than the flow collectors 25 and 25'. By quickly opening and closing the on/off valve 18, a visual check can be made for blocked holes in the split multihole spinneret 23. If any blocked holes are found, appropriate means should be taken to open them. When all the holes are open, the first flow control valve 15 is adjusted to give a desirable flow rate through the split multihole spinneret 23 with on/off valve 18 fully open. A visual check for leaks in the test system should be made, and if any leaks are present, they should be repaired. When leaks are repaired, the on/off valve 18 is closed and the test system, from the on/off valve 18, is allowed to drain. After the draining period, the disposal containers are replaced by clean, preweighed flow collectors 25 and 25'. The on/off valve 18 is open for a predetermined length of time and then closed; the test system, from the on/off valve 18, is again allowed to drain. The flow collectors 25 and 25' are removed, and the weights of their fluid contents as well as the difference in these weights are recorded. This constitutes one reading. The fluid collected in the disposal containers and the flow collectors 25 and 25' may be recycled, if desired, by emptying their contents into the tank 10.

The number of readings taken is important only insofar as the statistical accuracy desired. It is preferred that four readings be taken per spinneret; after two readings, the split multihole spinneret 23 is rotated and two additional readings are taken. This is to check for flow bias in the test system. The degree of rotation depends upon the disposition of the divider plates. For example, if two ends are to be extruded from a split multihole spinneret 23 which has an unpierced stripe bisecting its face, a flow divider 24 with a single divider plate 31 bisecting it will be used, and the degree of rotation will be 180°. It is recommended that spinnerets be well cleaned between tests. Whenever necessary the test system should also be cleaned. The tank 10 can be drained of test fluid 11 by closing the first shutoff valve 20 and opening all of the other valves. The tank 10 is then washed out with a solvent and drained. When refilling the tank 10, enough test fluid 11 should be supplied to cover the thermometer 12, the heating element 29 if used, and the recirculation dip pipe. The filters 22 and 28 should also be periodically cleaned.

The following examples further illustrate said preferred process and are not be be considered limiting of the invention in any manner.

EXAMPLE 1

Test apparatus was set up as shown schematically in FIG. 1. The fluid to be simulated was polyethylene terephthalate having a viscosity of about 1,000,000 centipoises, and the test fluid used was polyethylene glycol (Carbowax) having a viscosity of about 40 centipoises at the testing temperature. Split spinnerets having a single unpierced stripe dividing their faces into two halves, each having 192 holes, were tested. Within the tolerance allowed for the spinneret manufacture, the length of each hole was approximately twice the diameter of each hole. The flow divider had a single divider plate bisecting it into two open chambers, each of which had a tube leading therefrom to flow collectors. The temperature to which the polyethylene glycol (Carbowax) was heated by the centrifugal pump alone was 40° ± 3°C. The desired flow rate was approximately 20 pounds/minute, and the pressure was maintained at approximately 6 p.s.i.g. The Carbowax was pumped through the spinneret and the difference in throughput from the two sides of the spinneret was measured. It was found that a spinneret percent bias of 0.35 percent or less was required to maintain the total polyethylene terephthalate yarn product to within 1000 ± 20 for 1000 denier yarn.

Of 86 split spinnerets tested, only 32, or approximately 37.2 percent, had acceptable percent biases of 0.35 percent or less. The remaining 54 had to be reworked. The size of the standard hole length reduction was the largest possible within the tolerance range allowed for conventional spinneret manufacture and varied approximately 5.0 percent and 6.0 percent of the nominal hole length; holes with a length dimension in the higher end of the tolerance range had a smaller percentage of their length reduced while holes with a length dimension in the lower end of the tolerance range had a larger percentage of their length reduced. The number of holes to be reworked in the lower flow rate side was determined by the equation $$N = K \times D$$

where
- $N$ is the number of holes to be reworked,
- $k$ is a constant, preferably between 40 and 60, and
- $D$ is the test percent bias of the split spinneret.

Twenty-six split spinnerets were reworked with a value of $k$ between 40 and 60. Seventeen, or 65.4 percent, of the split spinnerets had to be reworked once to bring end to end variations in flow rate to within the required accuracy; seven, or 26.9 percent, of the split spinnerets had to be reworked twice to bring end to end variations in flow rate to within the required accuracy; and two, or 7.7 percent, had to be reworked 3 times to bring end to end variations in flow rate to within the required accuracy.

EXAMPLE 2

Example 2 was carried out substantially in accordance with Example 1. The fluid to be simulated was polycaproamide having a viscosity of about 300,000 centipoises, and the test fluid used was silicone oil having a viscosity of about 45 centipoises at the testing temperature. Results were similar to the results obtained in Example 1.

We claim:

1. An apparatus for dividing and channeling the fluid flow from the exit end of an inverted split multihole spinneret, said split multihole spinneret being divided into parts by means of an unpierced stripe wide enough to form a visible split in said fluid flow at the exit end of said split multihole spinneret, said apparatus for dividing and channeling the fluid flow from the exit end of said split multihole spinneret comprising:

a. an enclosed wall, said enclosed wall having a base, said enclosed wall along with said base being adapted to form a seal with the periphery of said exit end of said split multihole spinneret, without blocking any of the holes therethrough;

b. a divider plate, said divider plate having its ends secured in said enclosed wall;

c. sealing means, said sealing means being affixed to the bottom of said divider plate to form a seal with said unpierced stripe when said base of said enclosed wall is sealed against said periphery of said exit end of said split multihole spinneret, said enclosed wall with said divider plate thereby defining a plurality of open chambers the bases of which are formed by said exit end of said split multihole spinneret, the portion of said enclosed wall defining each of said open chambers having an aperture therein; and d. a plurality of tubes, the number of said tubes corresponding to the number of said apertures in said enclosed wall and leading outwardly therefrom; whereby the fluid flowing through said split multihole spinneret divides as it exits therefrom to flow through said tubes to a plurality of collection points.

2. An apparatus for dividing and channeling the fluid flow from the exit end of an inverted split multihole spinneret, the split spinneret being divided into two parts by means of an unpierced stripe wide enough to form a visible split in said fluid flow at the exit end of said split spinneret, said apparatus for dividing and channeling the fluid flow from the exit end of said split spinneret comprising:

a. an enclosed wall, said enclosed wall having a base, said base being adapted to form a seal with the periphery of said exit end of said split spinneret without blocking any of the holes therethrough, said enclosed wall also having one divider plate, said divider plate having its ends terminating at the interior of said enclosed wall; and b. sealing means, said sealing means being affixed to the bottom of said divider plate of said enclosed wall so as to form a seal with said unpierced stripe of said split spinneret, said enclosed wall with its said divider plate thereby defining two open chambers the bases of which are formed by said exit end of said split spinneret, the portion of said enclosed wall defining each of said open chambers having an aperture therein with a tube leading outwardly therefrom, said apertures being at such distance from said base of said enclosed wall that the fluid flowing through said split spinneret is divided as it exits therefrom to flow through said tubes to two collection points.

* * * * *